US012785286B2

(12) United States Patent
Hwang et al.

(10) Patent No.: US 12,785,286 B2
(45) Date of Patent: Nov. 3, 2026

(54) ELECTROMAGNETIC BADNGAP-INTEGRATED ANTENNA

(71) Applicant: RESEARCH & BUSINESS FOUNDATION SUNGKYUNKWAN UNIVERSITY, Suwon-si (KR)

(72) Inventors: Keum Cheol Hwang, Seoul (KR); Ho Jeong Yu, Suwon-si (KR); Kang Yoon Lee, Seoul (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 10 days.

(21) Appl. No.: 19/047,175

(22) Filed: Feb. 6, 2025

(65) Prior Publication Data

US 2026/0163247 A1 Jun. 11, 2026

(30) Foreign Application Priority Data

Dec. 6, 2024 (KR) ........................ 10-2024-0180052

(51) Int. Cl.
*H01Q 15/00* (2006.01)
*H01Q 1/48* (2006.01)
*H01Q 9/16* (2006.01)

(52) U.S. Cl.
CPC ............. *H01Q 15/006* (2013.01); *H01Q 1/48* (2013.01); *H01Q 9/16* (2013.01)

(58) Field of Classification Search
CPC ........... H01Q 15/006; H01Q 1/48; H01Q 9/16
See application file for complete search history.

(56) References Cited

U.S. PATENT DOCUMENTS

| | | | | |
|---|---|---|---|---|
| 2009/0295665 A1* | 12/2009 | Orton | H01Q 15/006 343/700 R | |
| 2015/0029062 A1* | 1/2015 | Ng | H01Q 1/48 343/756 | |
| 2017/0214150 A1* | 7/2017 | Zhao | H01Q 21/0025 | |
| 2017/0317421 A1* | 11/2017 | Grando | H01Q 15/006 | |
| 2019/0229398 A1* | 7/2019 | Ryoo | H01Q 1/2283 | |
| 2024/0332820 A1* | 10/2024 | Noghanian | H01Q 21/065 | |

FOREIGN PATENT DOCUMENTS

| | | | |
|---|---|---|---|
| JP | 2023-106892 | A | 8/2023 |
| KR | 10-2015-0110373 | A | 10/2015 |
| KR | 10-2021-0151603 | A | 12/2021 |
| KR | 10-2022-0054156 | A | 5/2022 |
| KR | 10-2023-0120935 | A | 8/2023 |
| KR | 10-2667512 | B1 | 5/2024 |

* cited by examiner

*Primary Examiner* — Hai V Tran

(57) ABSTRACT

According to an embodiment of the present invention, an electromagnetic bandgap integrated antenna comprises a dipole and an EBG array including a surface wave EBG array including a plurality of surface wave EBG patches arranged in a direction perpendicular to a propagation direction of a surface wave, and a bandgap EBG array including a plurality of bandgap EBG patches arranged in parallel to the plurality of surface wave EBG patches, the EBG array being spaced apart from a lower portion of the dipole.

13 Claims, 9 Drawing Sheets

1

ELECTROMAGNETIC BADNGAP-INTEGRATED ANTENNA

CROSS-REFERENCE TO RELATED APPLICATIONS

This application claims the priority benefit of Korean Patent Application No. 10-2024-0180052 filed on Dec. 6, 2024 in the Korean Intellectual Property Office, the disclosures of which are incorporated herein by reference.

BACKGROUND

1. Field

The present invention relates to an electromagnetic bandgap-integrated antenna, and more particularly, to an electromagnetic bandgap-integrated antenna for implementing a wireless electronic neural bypass.

2. Description of the Related Art

With the rapid development of wearable devices and medical communication equipment, the demand for wireless communication technology capable of stably operating near the human body is increasing. However, since a human body has a high dielectric constant and conductivity, electromagnetic waves may be reflected from or absorbed by a surface of the human body. Such a characteristic causes distortion of the antenna radiation pattern and signal loss, and in particular, stable communication becomes difficult in an environment close to a human body.

In order to solve this problem, a conventional antenna designs have proposed methods of improving radiation characteristics in a specific frequency band or reducing electromagnetic wave absorption by employing structure such as a metasurface. For example, in order to reduce the interaction with the human body, the antenna is often designed to radiate in a perpendicular (broadside) direction. This has contributed to reducing the backward radiation of the antenna and improving the propagation efficiency in a specific frequency band.

However, the perpendicular radiation designs strengthen electromagnetic isolation from the human body, but in the case of implementing axial radiation(end-fire), it causes a problem of distorting the radiation pattern, so that there is a limitation in that the signal is not radiated in a desired direction. In addition, due to the high permittivity and conductivity of the human body, the radiation pattern or scattering parameters (S-parameters) of the antenna are distorted. Accordingly, research on an antenna capable of stabilizing a radiation pattern, minimizing rearward radiation, and implementing a radiation pattern in the form of an End-fire has been actively conducted.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The present invention provides an electromagnetic bandgap-integrated antenna for implementing wireless electronic neural bypass in the ISM band.

According to an embodiment of the present invention, an electromagnetic bandgap integrated antenna comprises a dipole and an EBG array including a surface wave EBG array including a plurality of surface wave EBG patches arranged in a direction perpendicular to a propagation direction of a surface wave, and a bandgap EBG array including a plurality of bandgap EBG patches arranged in parallel to the plurality of surface wave EBG patches, the EBG array being spaced apart from a lower portion of the dipole.

According to an embodiment of the present invention, the dipole is spaced above the surface wave EBG patch located in the center of the surface wave EBG array.

According to an embodiment of the present invention, the dipole is spaced apart to include the entire surface wave EBG patches region.

According to an embodiment of the present invention, a plurality of the surface wave EBG array is arranged in a propagation direction of a surface wave.

According to an embodiment of the present invention, the dipole is spaced apart from an upper portion of the surface wave EBG array adjacent to the bandgap EBG array among the plurality of surface wave EBG array.

According to an embodiment of the present invention, the surface wave EBG patch has a rectangular shape with a shorter length in the propagation direction of a surface wave.

According to an embodiment of the present invention, a length of the band gap EBG array in a direction perpendicular to a propagation direction of the surface wave is longer than a length of the surface wave EBG array in a direction perpendicular to the propagation direction of the surface wave.

According to an embodiment of the present invention, the electromagnetic bandgap integrated antenna further comprises a ground plate spaced apart below the EBG array and connected to the dipole through a feed via.

According to an embodiment of the present invention, the ground plate is coupled with the EBG array through an EBG via.

According to an embodiment of the present invention, the feed via passes through the EBG array without being connected thereto.

According to an embodiment of the present invention, the dipole and the feed via are connected within the same surface wave EBG patch region.

According to an embodiment of the present invention, the surface wave EBG array includes three surface wave EBG patches arranged perpendicular to the propagation direction of a surface wave and three surface wave EBG patches arranged along the propagation direction of a surface wave.

According to an embodiment of the present invention, the bandgap EBG array includes five bandgap EBG patches arranged perpendicular to the propagation direction of a surface wave.

According to the above-described electromagnetic bandgap-integrated antenna, it is possible to provide an electromagnetic bandgap-integrated antenna for implementing wireless electronic neural bypass in the ISM band.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
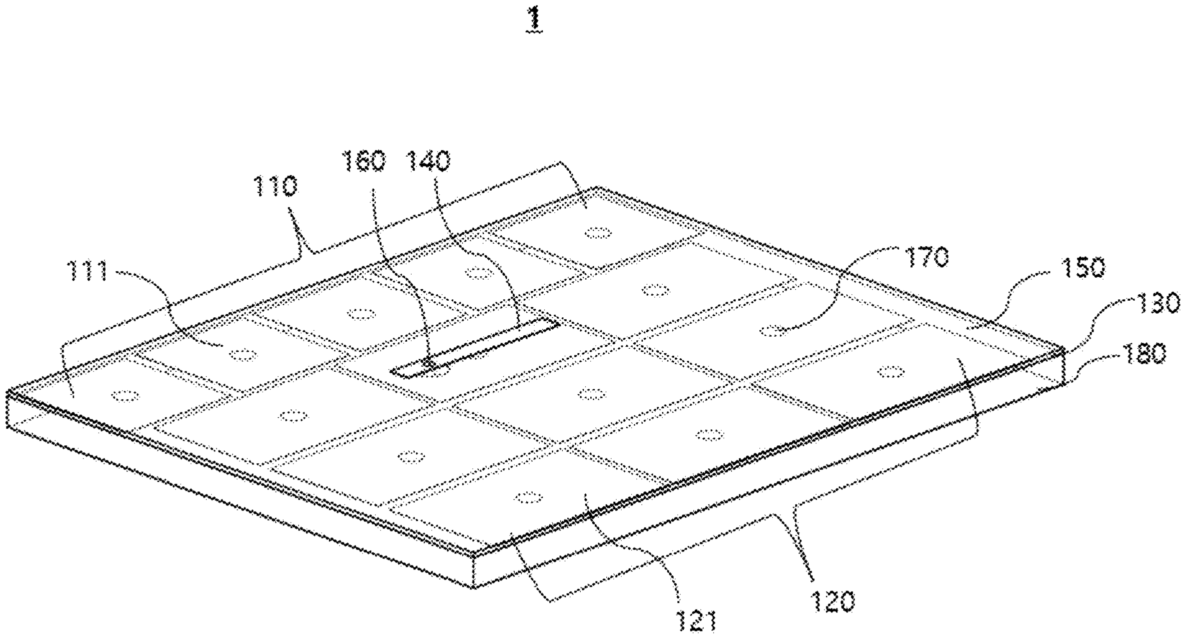
FIG. 1 is a perspective view of an electromagnetic bandgap-integrated antenna according to an embodiment of the present invention.

The advantages and features of the present invention, and the methods for achieving them, will become apparent with reference to the embodiments described below in conjunction with the accompanying drawings. However, the present invention is not limited to the embodiments disclosed herein and may be implemented in various forms. These embodiments are provided merely to ensure the completeness of the disclosure of the present invention and to fully inform those skilled in the art of the scope of the invention. The invention is only defined by the scope of the claims.

Terms used in this specification will be briefly described, followed by a detailed description of the present invention.

The terms used in the present invention have been selected, where possible, as generally accepted terms currently in widespread use, taking into account the functions of the present invention. However, such terms may vary depending on the intent of the technician in the field, precedents, or the emergence of new technology. Additionally, in certain cases, terms arbitrarily chosen by the applicant may be used, in which case their meanings will be described in detail in the relevant parts of the specification. Therefore, the terms used in this invention should not be interpreted based solely on their names but should be defined based on their meanings and the overall context of the present invention.

Throughout the specification, when a part is described as "including" a specific component, it is to be understood that, unless otherwise stated, it does not exclude other components but may further include additional components.

Hereinafter, the embodiments of the present invention will be described in detail with reference to the accompanying drawings so that those skilled in the art may easily practice the invention. In the drawings, portions unrelated to the explanation of the invention may be omitted for clarity.

Terms such as "first" and "second," which include ordinal numbers, may be used to describe various components but do not limit the components by the terms. The terms are used solely for distinguishing one component from another. For example, within the scope of the present invention, a "first" component may be referred to as a "second" component, and similarly, a "second" component may be referred to as a "first" component. The term "and/or" includes combinations of multiple related items or any one of the multiple related items.

FIG. 1 is a perspective view of an electromagnetic bandgap-integrated antenna 1 according to an embodiment of the present invention.

Figure 2:
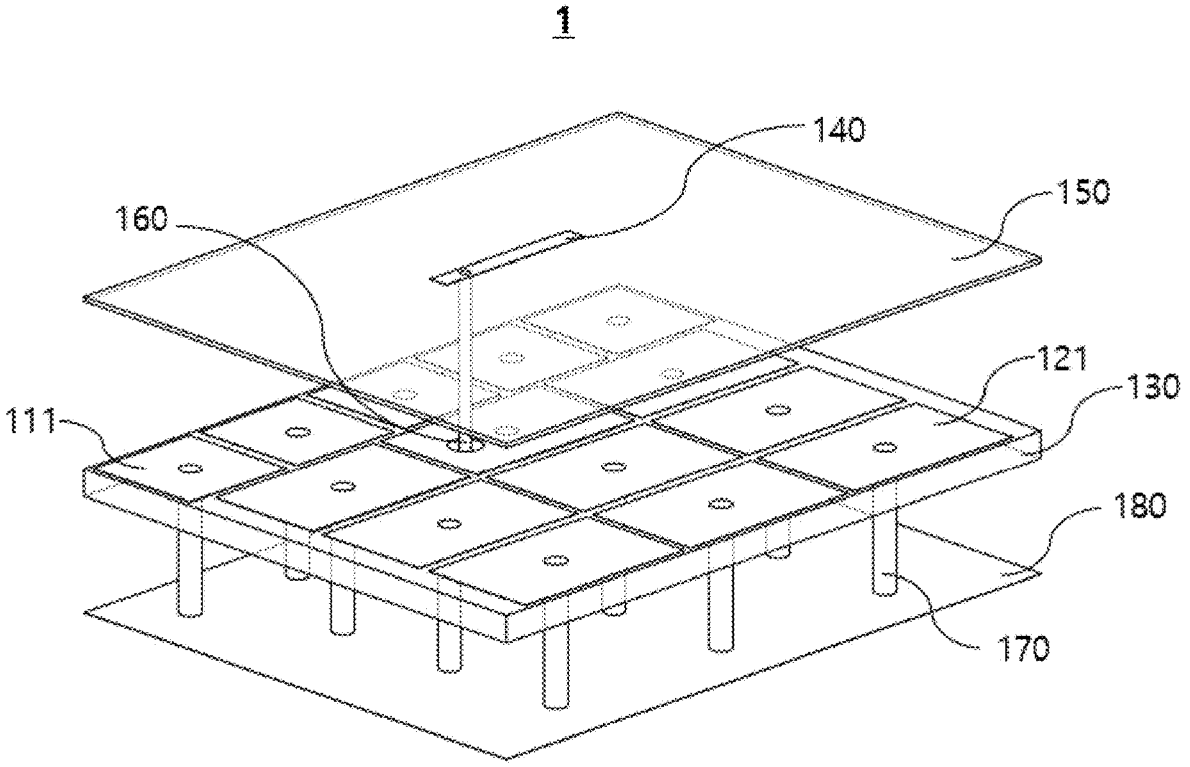
FIG. 2 is an exploded view of an electromagnetic bandgap-integrated antenna according to an embodiment of the present invention.

FIG. 2 is an exploded view of an electromagnetic bandgap-integrated antenna 1 according to an embodiment of the present invention.

Figure 3:
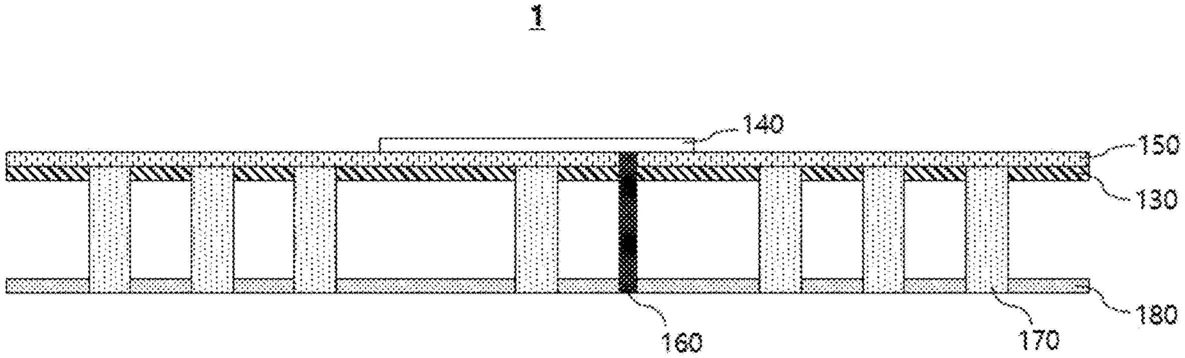
FIG. 3 is a side view of the electromagnetic bandgap-integrated antenna according to an embodiment of the present invention.

FIG. 3 is a side view of the electromagnetic bandgap-integrated antenna 1 according to an embodiment of the present invention.

Referring to FIGS. 1 to 3, an electromagnetic bandgap-integrated antenna 1 may include a dipole 140, a dipole substrate 150, an EBG substrate 130, a feed via 160, an EBG via 170, and a ground plate 180.

The ground plate 180 may be provided at the lowermost end of the antenna 1 to be connected to the EBG substrate through the plurality of EBG vias 170, and may be connected to the dipole 140 located at the uppermost end of the antenna 1 through the EBG substrate 130 through the feed via 160. The dipole substrate 150 may be provided on an upper portion of the EBG substrate 130, and the dipole 140 may be provided on an upper portion of the dipole substrate 150.

The dipole substrate 150 may be a substrate having a thickness of 0.25 mm and a dielectric constant of 10.2, the EBG substrate 130 may be a substrate having a thickness of 1.52 mm and a dielectric constant of 2.2, and the height of the antenna 1 may be 1.77 mm. A miniaturized structure may be implemented by minimizing the thickness and overall height of the substrate.

Figure 4:
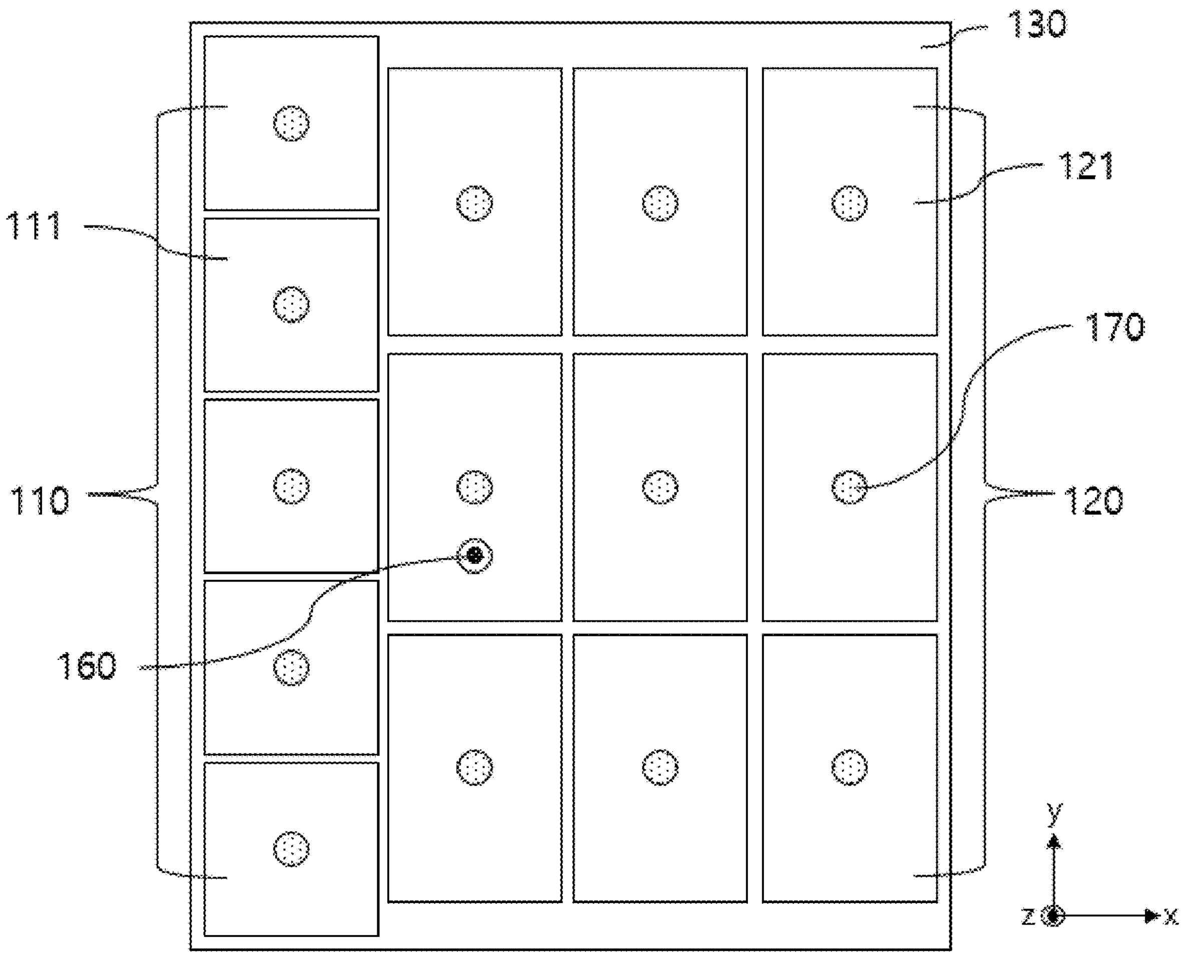
FIG. 4 is a top view of the EBG substrate according to one embodiment of the present invention.

FIG. 4 is a top view of the EBG substrate 130 according to one embodiment of the present invention.

Referring to FIG. 4, in the EBG substrate 130 on which the surface wave EBG array 120 and the band gap EBG array 110 of the antenna 1 are arranged, the x-axis may indicate the propagation direction of the surface wave by the arranged surface wave EBG patch 121, and the y-axis may indicate a direction perpendicular to the propagation direction of the surface wave by the arranged surface wave EBG patch 121.

The band gap EBG array 110 and the surface wave EBG array 120 may be disposed on the EBG substrate 130. The band gap EBG array 110 may include a plurality of band gap EBG patches 111, and the surface wave EBG array 120 may include a plurality of surface wave EBG patches 121. In the surface wave EBG array 120, the plurality of surface wave EBG patches 121 may be arranged in a direction perpendicular to a surface wave propagation direction, and in the bandgap EBG array 110, the plurality of bandgap EBG patches 111 may be arranged in a direction perpendicular to the surface wave propagation direction.

The band gap EBG array 110 may be adjacently arranged to be parallel in a direction opposite to a surface wave propagation direction of the surface wave EBG array 120 (−x axis). When the band gap EBG patch 111 is not arranged in parallel to the surface wave EBG patch 121, the surface wave EBG patch 121 may have a bidirectional radiation pattern, and the band gap EBG array 110 arranged in parallel to the surface wave EBG array 120 suppresses the rearward radiation of the surface wave EBG array 120, so that the antenna 1 may perform end-fire radiation. The end-fire radiation may refer to the x-axis direction in FIG. 2.

A plurality of surface wave EBG arrays 120 may be further arranged in the propagation direction (x-axis) of the surface wave to maximize the end-fire radiation of the surface wave of the antenna 1, and may help the surface wave to propagate in a desired direction to prevent distortion of the radiation pattern.

In the band gap EBG array 110 arranged parallel to the surface wave EBG array 120, a length in a perpendicular direction of a surface wave propagation direction may be longer than a length in a perpendicular direction of the surface wave propagation direction of the surface wave EBG array 120. The band gap EBG array 110 may further suppress a surface wave propagated in a direction opposite to a propagation direction of the surface wave (-x axis) to suppress backward radiation, and may enable unidirectional radiation by reducing the backward radiation.

The EBG via 170 may pass through the center of the EBG substrate 130 and the surface wave EBG patch 121 or the band gap EBG patch 111. The feed via 160 may pass through without being connected to the EBG substrate 130 and connect the ground plate 180 with the dipole 140 and the dipole substrate 150. The feed via 160 may serve as a path for delivering power to the dipole 140 and may not be connected to the EBG substrate 130, thereby minimizing its impact on the surface wave and band gap characteristics of the EBG.

In the surface wave EBG array 120 in which the surface wave EBG patch 121 is further arranged in the propagation direction of the surface wave, the dipole 140 may be positioned on the surface wave EBG patch 121 positioned at the center of the surface wave EBG array 120, and may be positioned on the surface wave EBG patch 121 adjacent to the band gap EBG patch 111 arranged in parallel. The closer the dipole 140 is positioned above the surface wave EBG patch 121 adjacent to the band gap EBG patch 111, the more the backward radiation can be suppressed.

The surface wave EBG patch 121 may have a rectangular shape having a shorter length in a propagation direction of a surface wave. The rectangular surface wave EBG patch 121 having a shorter surface wave propagation direction may quickly concentrate a surface wave forward and suppress unnecessary surface wave leakage and reflection, thereby maximizing forward radiation efficiency.

The bandgap EBG patch 111 may have a square shape. The square-shaped band gap EBG patch 111 may uniformly provide band gap characteristics in all directions in a symmetrical structure, and this symmetry may ensure that the band gap is evenly formed in a specific frequency band.

The antenna 1 may include a surface wave EBG array 120 in which three surface wave EBG patches 121 are arranged in a direction perpendicular to a surface wave propagation direction, and three surface wave EBG patches 121 are arranged in the surface wave propagation direction. Also, the antenna 1 may include a band gap EBG array 110 in which five band gap EBG patches 111 are arranged in a direction perpendicular to the surface wave propagation direction. That is, the 1×5 band gap EBG array 110 and the 3×3 surface wave EBG array 120 may be included, and the band gap EBG array 110 of 1×5 may be arranged in parallel in a direction opposite to a surface wave propagation direction of the surface wave EBG array 120 of 3×3.

Figure 5:
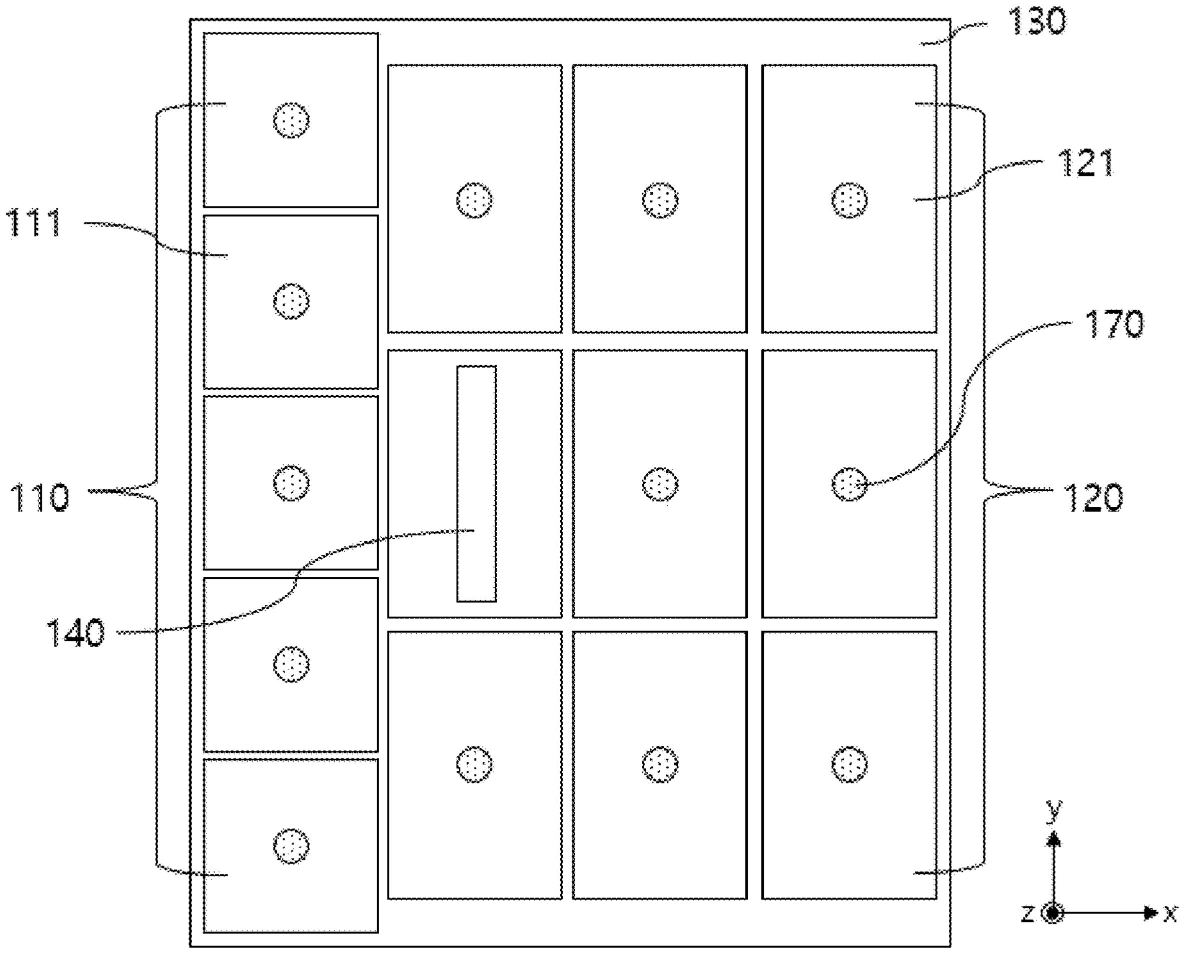
FIG. 5 is a top view of the dipole projected onto the EBG substrate according to one embodiment of the present invention.

FIG. 5 is a top view of the dipole 140 projected onto the EBG substrate 130 according to one embodiment of the present invention.

FIG. 5 illustrates a top view of the EBG substrate 130 where the dipole 140, spaced apart from the EBG substrate 130, is projected onto the EBG substrate 130. Referring to FIG. 5, the dipole 140 may be located within the region of the surface wave EBG patch 121. The dipole 140 and the feed via (not shown) 160 connected thereto may be connected within the same surface wave EBG patch 121 region.

Figure 6:
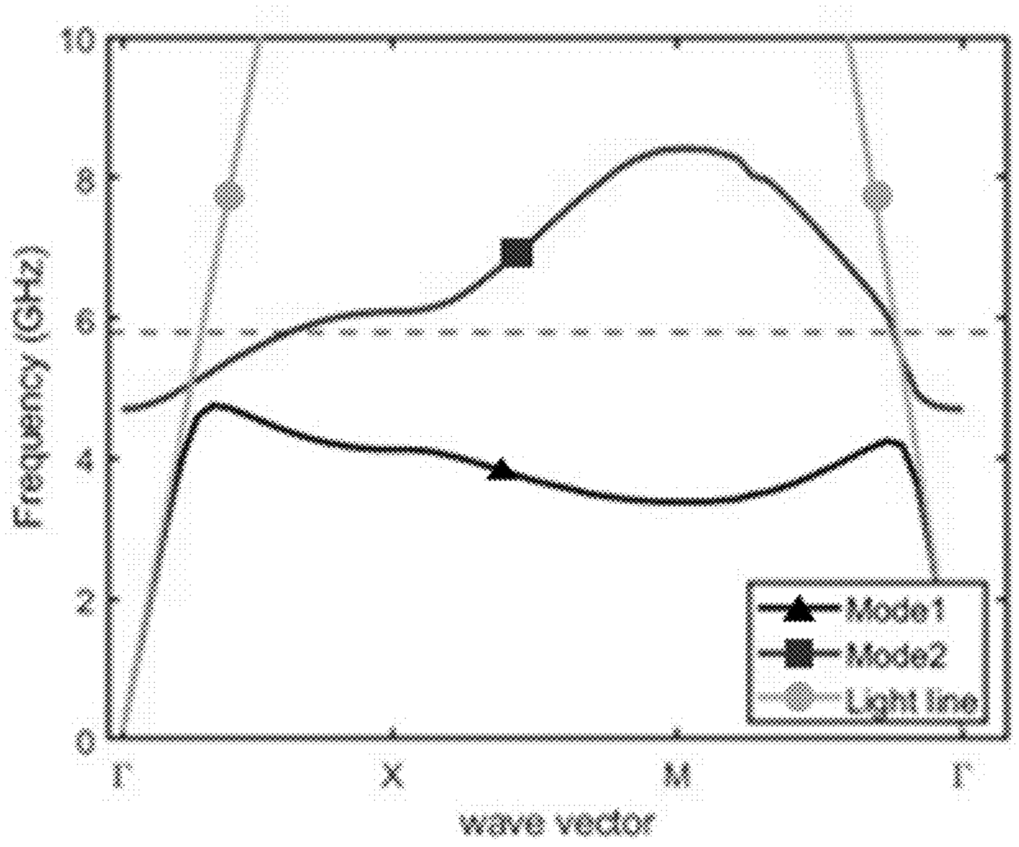
FIG. 6 is a dispersion diagram of the surface wave EBG patch according to an embodiment of the present invention.

FIG. 6 is a dispersion diagram of the surface wave EBG patch 121 according to an embodiment of the present invention.

Figure 7:
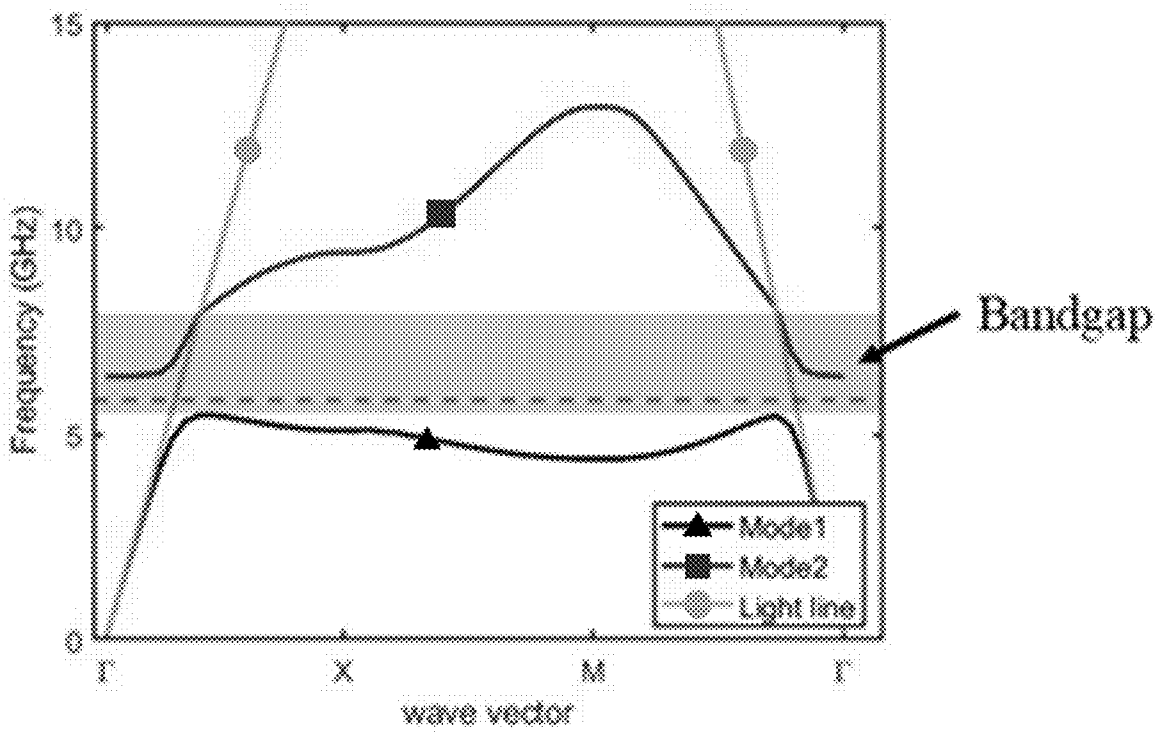
FIG. 7 is a dispersion diagram of the bandgap EBG patch according to an embodiment of the present invention.

FIG. 7 is a dispersion diagram of the bandgap EBG patch 111 according to an embodiment of the present invention.

In the EBG, surface waves such as TM and TE, which are basic modes, may exist in a frequency domain of interest. Referring to FIGS. 6 and 7, the x-axis may represent a wave vector in which an electromagnetic wave propagates, the y-axis may represent a frequency of the electromagnetic wave, and the Light line may represent a propagation boundary in free space.

Mode 1 may indicate TM wave as a wave mainly propagating at a low frequency, and Mode 2 may indicate TE wave as a wave mainly propagating at a high frequency. The dotted line may represent the resonance frequency of 5.8 GHz.

Referring to FIG. 6, when viewing an inner region formed by Light line, a dotted line, and Mode 2, it can be seen that TE wave, which is mode 2 inside light line, is formed close to Light line in 5.8 GHz. Accordingly, it may indicate that the surface wave is formed in the Light line, dotted line, and Mode 2 regions.

Referring to FIG. 7, it can be seen that there is no mode formation within the bandgap from 5.4 GHz, which is the cutoff frequency of the fundamental mode TM wave, to 7.9 GHz, where the TE wave propagates.

Accordingly, referring to FIGS. 6 and 7, it can be seen that the band gap is formed so that the surface wave cannot proceed in the 5.8 GHz, thereby suppressing the backward radiation. In the ISM band (5.725 GHz to 5.875), the electromagnetic bandgap-integrated antenna 1 according to an embodiment of the present disclosure may indicate that the band gap EBG array 110 disposed parallel to the surface wave EBG array 120 may maximally reduce the backward radiation and maximize the forward radiation efficiency.

Figure 8:
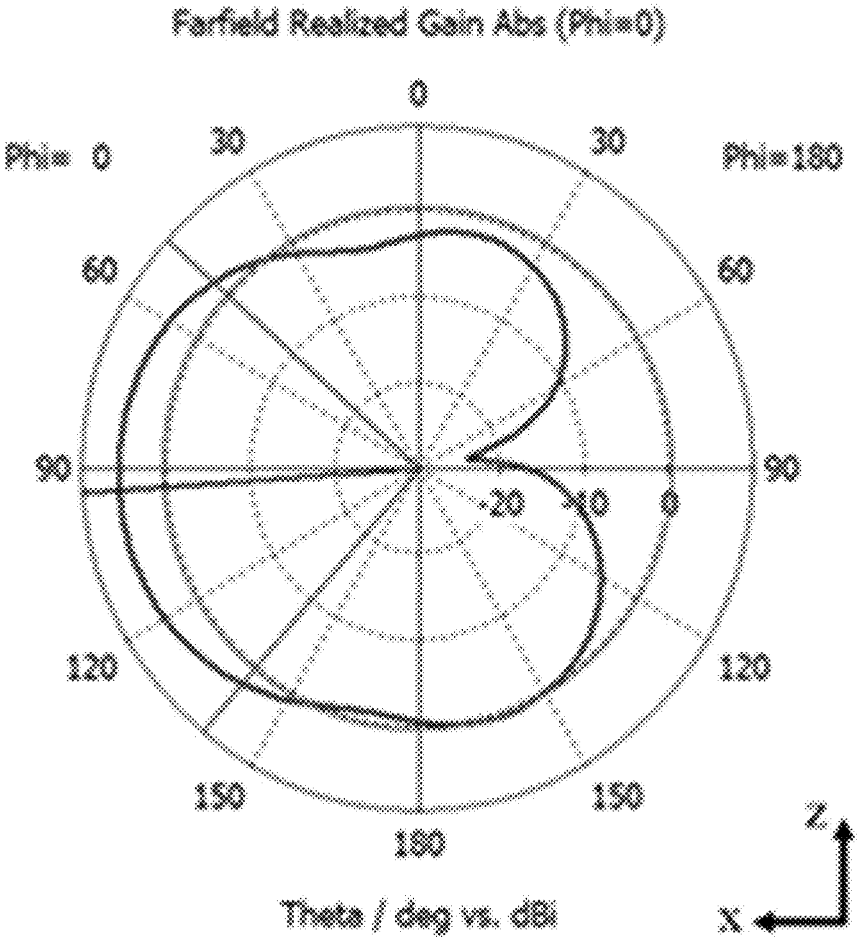
FIG. 8 is a radiation pattern graph in the xz plane of the electromagnetic bandgap-integrated antenna according to an embodiment of the present invention.

FIG. 8 is a radiation pattern graph in the xz plane of the electromagnetic bandgap-integrated antenna 1 according to an embodiment of the present invention.

Figure 9:
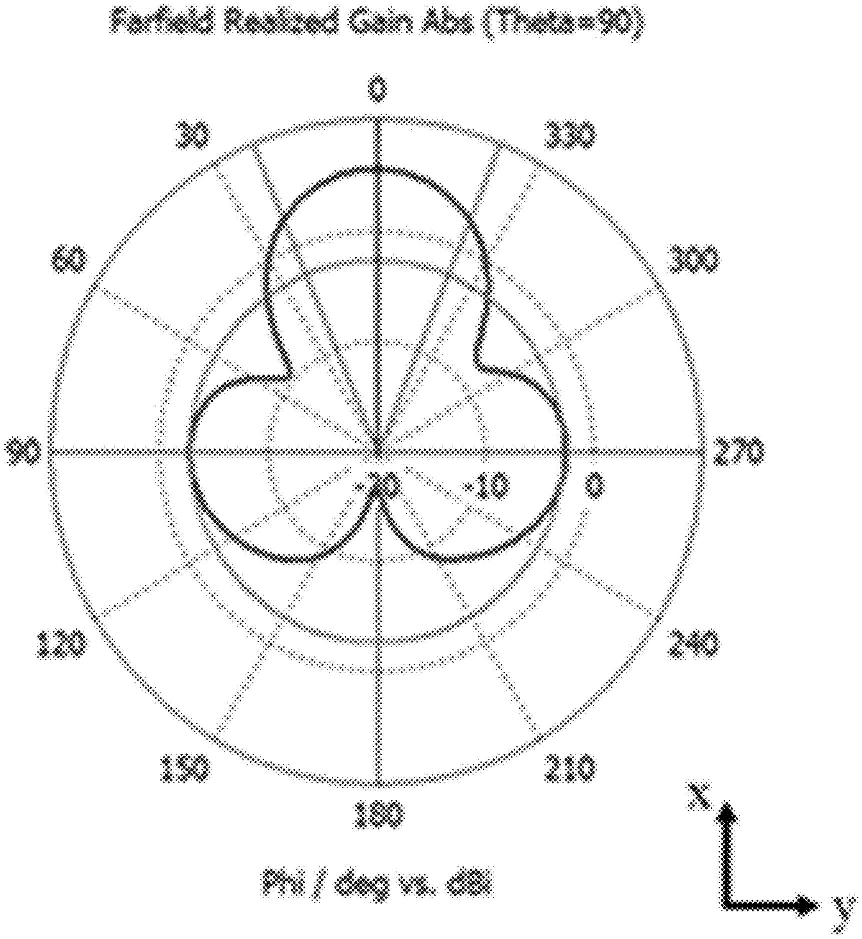
FIG. 9 is a radiation pattern graph in the xy plane of the electromagnetic bandgap-integrated antenna according to an embodiment of the present invention.

FIG. 9 is a radiation pattern graph in the xy plane of the electromagnetic bandgap-integrated antenna 1 according to an embodiment of the present invention.

Referring to FIGS. 8 and 9, the x-axis and the y-axis are the same as the direction described in FIG. 2, and the z-axis represents a perpendicular direction with respect to an axis on which the dipole 140 and the EBG substrate 130 are disposed in the physical structure of the antenna 1.

It can be seen that the forward radiation gain is 5.57 dBi in the xz plane, 5.55 dBi in the xy plane, the backward radiation gain is −18.83 dBi in the xz plane, and −16.38 dBi in the xy plane. This may indicate that the electromagnetic bandgap-integrated antenna 1 according to an embodiment of the present invention provides excellent unidirectional radiation performance by suppressing backward radiation.

Those skilled in the art to which the embodiments of the present invention pertain will understand that the invention can be implemented in modified forms without departing from the essential characteristics described above. Therefore, the disclosed methods should be considered from an explanatory perspective rather than a limiting one. The scope of the present invention is defined by the claims, not by the detailed description, and all differences within the equivalent scope are to be interpreted as included within the scope of the present invention.

What is claimed is:

1. An electromagnetic bandgap-integrated antenna comprising:

a dipole; and an EBG array including a surface wave EBG array including a plurality of surface wave EBG patches arranged in a direction perpendicular to a propagation direction of a surface wave radiated from the surface wave EBG array, and a bandgap EBG array including a plurality of bandgap EBG patches arranged in parallel to the plurality of surface wave EBG patches, the EBG array being spaced apart from a lower portion of the dipole, wherein a length of the band gap EBG array in a direction perpendicular to a propagation direction of the surface wave is longer than a length of the surface wave EBG array in a direction perpendicular to the propagation direction of the surface wave.

2. The electromagnetic bandgap-integrated antenna according to claim 1, wherein the dipole is spaced above a surface wave EBG patch located in the center of the surface wave EBG array.

3. The electromagnetic bandgap-integrated antenna according to claim 2, wherein the dipole is spaced apart from the surface wave EBG patch by a dipole substrate.

4. The electromagnetic bandgap-integrated antenna according to claim 1, wherein a plurality of surface wave EBG patches in the surface wave EBG array are arranged in the propagation direction of the surface wave.

5. The electromagnetic bandgap-integrated antenna according to claim 4, wherein the dipole is spaced apart from an upper portion of the surface wave EBG array adjacent to the bandgap EBG array among the plurality of surface wave EBG patches.

6. The electromagnetic bandgap-integrated antenna according to claim 1, wherein each of the surface wave EBG patches has a rectangular shape with a shorter length in the propagation direction of the surface wave.

7. The electromagnetic bandgap-integrated antenna according to claim 1, wherein each of the bandgap EBG patches has a square shape.

8. The electromagnetic bandgap-integrated antenna according to claim 1, further comprising:

a ground plate spaced apart below the EBG array and connected to the dipole through a feed via.

9. The electromagnetic bandgap-integrated antenna according to claim 8, wherein the ground plate is coupled with the EBG array through an EBG via.

10. The electromagnetic bandgap-integrated antenna according to claim 8, wherein the feed via passes through the EBG array without being connected thereto.

11. The electromagnetic bandgap-integrated antenna according to claim 8, wherein the dipole and the feed via are connected within a same surface wave EBG patch region.

12. The electromagnetic bandgap-integrated antenna according to claim 1, wherein the surface wave EBG array is a 3×3 array of surface wave EBG patches arranged perpendicular to the propagation direction of a surface wave and along the propagation direction of a surface wave.

13. The electromagnetic bandgap-integrated antenna according to claim 1, wherein the bandgap EBG array includes five bandgap EBG patches arranged perpendicular to the propagation direction of the surface wave.

* * * * *